Figure 1:
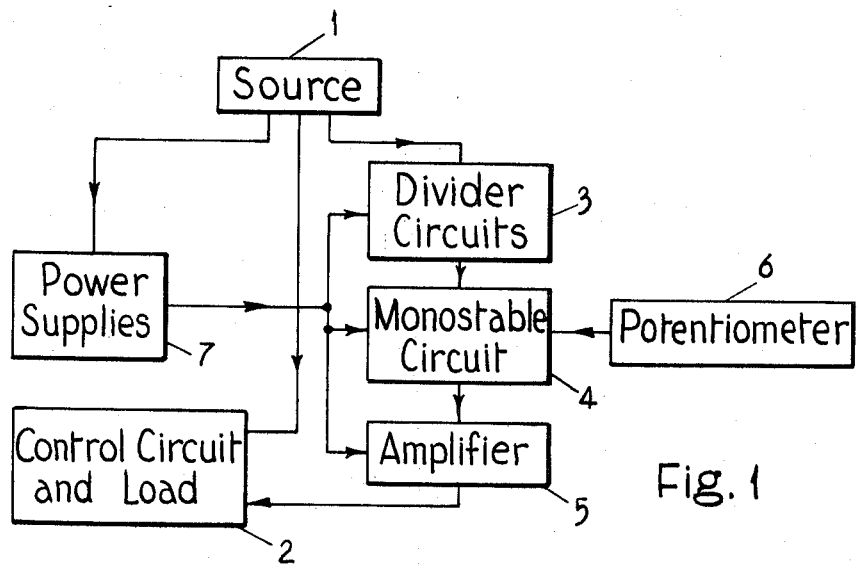

Jan. 25, 1966     D. B. PALEY     3,231,812
ELECTRIC CIRCUITS FOR CONTROLLING THE SUPPLY OF
ELECTRIC CURRENT TO A LOAD
Filed Feb. 8, 1962     2 Sheets-Sheet 1

INVENTOR
DEREK BRIAN PALEY
BY
ATTORNEYS

INVENTOR
DEREK BRIAN PALEY

United States Patent Office 3,231,812
Patented Jan. 25, 1966

3,231,812
ELECTRIC CIRCUITS FOR CONTROLLING THE SUPPLY OF ELECTRIC CURRENT TO A LOAD
Derek Brian Paley, Tottenham, London, England, assignor to The General Electric Company Limited, London, England
Filed Feb. 8, 1962, Ser. No. 171,883
Claims priority, application Great Britain, Feb. 10, 1961, 5,035/61; Sept. 25, 1961, 34,227/61
16 Claims. (Cl. 321—18)

This invention relates to electric circuits for controlling the supply of electric current to a load.

More particularly, but not exclusively, the invention is concerned with electric circuits for controlling the supply of electric current to electric discharge lamps which may, for example, be neon lamps, or to fluorescent lamps, or to electro-luminescent panels.

When operating neon lamps, a problem arises where it is required to provide a control to enable the lamps to be dimmed when necessary. Such a control cannot be effected merely by varying the voltage of the supply to the lamps, as it is a characteristic of a neon lamp that no discharge takes place until the voltage applied to the lamp exceeds a certain level (the discharge then continuing until the applied voltage falls below a second level which, in general, is somewhat lower than the level necessary to start the discharge).

It is, therefore, an object of the present invention to provide an electric circuit for controlling the supply of electric current to a load, the circuit being such that when used for controlling the supply of electric current to neon lamps, say, it enables the problem mentioned above to be, at least in part, overcome.

Reference is made in this specification to semiconductor controlled rectifiers. By a semiconductor controlled rectifier is meant a semiconductor device including a semiconductor body in which a series of p-n junctions are formed between two main electrodes (the anode and the cathode), and including a further electrode (the gate) formed on a region of the semiconductor body intermediate between the main electrodes, the device exhibiting an impedance to current flow between the anode and the cathode which is high in the reverse direction (which corresponds to the anode being at a negative potential with respect to the cathode) for applied anode-cathode voltages below a certain value (the reverse breakdown voltage) and which in the forward direction can have either a low or a high value for applied anode-cathode voltages below a certain value (the forward breakdown voltage), the arrangement being such that with an anode-cathode voltage less than the forward breakdown voltage applied in the forward direction the device can be caused to fire (that is to say the impedance of the device in the forward direction can be changed suddenly from a high value to a low value) by causing a sufficiently large current to flow in an appropriate sense through the gate, but the device cannot thereafter be rendered quiescent (that is to say returned to its high impedance condition in a forward direction) merely by reducing the current flowing through the gate.

According to one aspect of the present invention, an electric circuit for controlling the supply of electric current to a load comprises a rectifier bridge across one diagonal of which is arranged to be supplied an alternating current signal form a source, the load being arranged to be connected in the path between one end of said diagonal and the source, the source then supplying an alternating current voltage to the load when gate means associated with the rectifier bridge has a given condition, and means to derive from the source a signal having a frequency not greater than twice the frequency of the signal supplied to the rectifier bridge, each cycle of this derived signal being arranged to trigger to two-condition monostable circuit into its unstable condition and the gate means being controlled so that it has said given condition while the monostable circuit is in one only of its conditions, the monostable circuit having provision to vary the duration of intervals during which it remains in its unstable condition subsequent to being triggered into this unstable condition, the arrangement being such that variation of the duration of the intervals during which the monostable circuit remains in its unstable condition results in control of the supply of electric current to the load.

According to another aspect of the present invention, an electric circuit for controlling the supply of electric current to a load comprises rectifier means to which is arranged to be supplied an alternating current signal from a source, a rectifier means then supplying a unipolar voltage to the output of the circuit, to which the load is arranged to be connected, when gate means associated with the rectifier means has a given condition, and means to derive from the source a signal having a frequency not greater than twice the frequency of the signal supplied to said rectifier means, each cycle of this derived signal being arranged to trigger a two-condition monostable circuit into its unstable condition and the gate means being controlled so that it has said given condition while the monostable circuit is in one only of its conditions, the monostable circuit having provision to vary the duration of intervals during which it remains in its unstable condition subsequent to being triggered into this unstable condition, the arrangement being such that variation of the duration of the intervals during which the monostable circuit remains in its unstable condition results in control of the supply of electric current to the load.

The gate means may comprise a semiconductor controlled rectifier which is controlled to have its low impedance in the forward direction when the monostable circuit is in said given condition.

Figure 2:
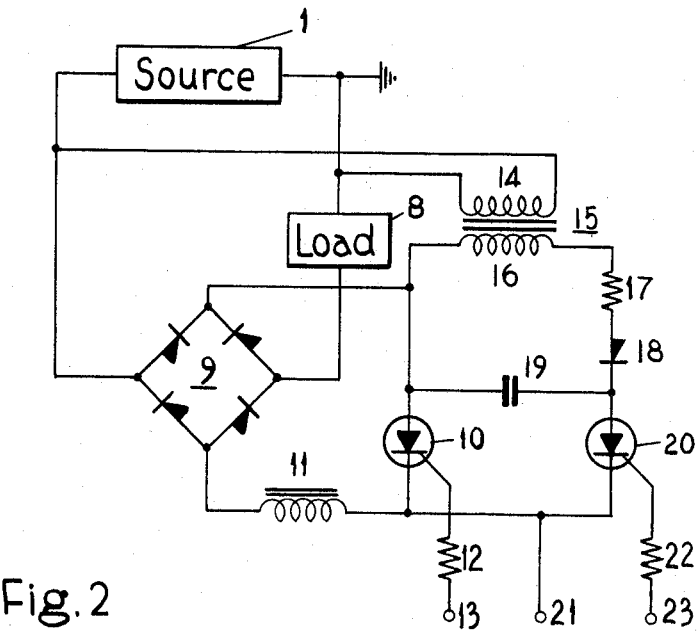
Figure 3:
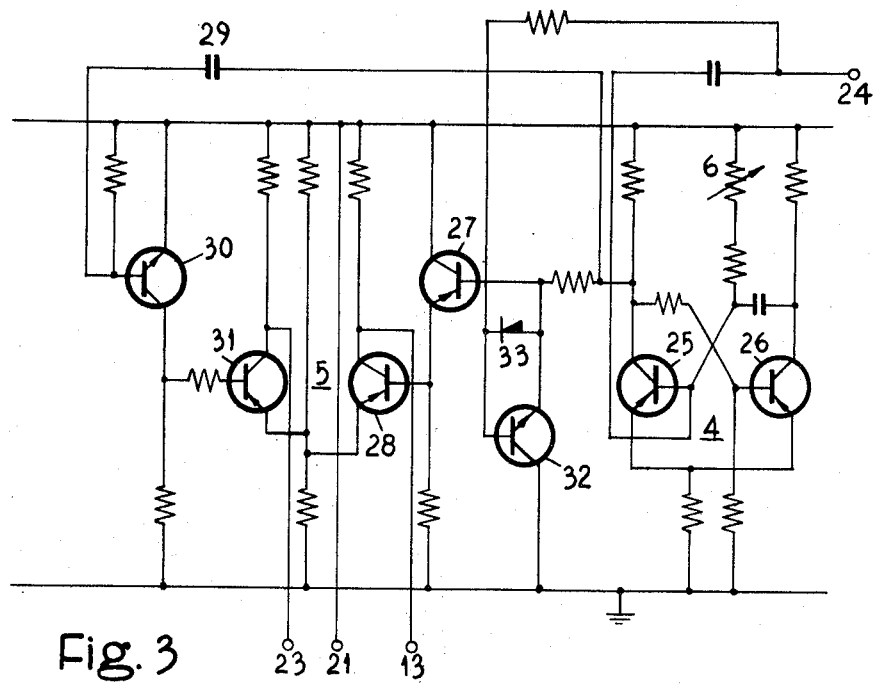
Figure 4:
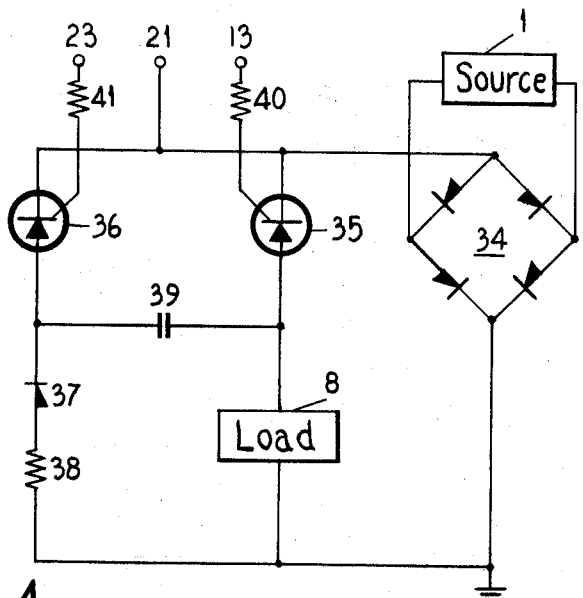

One example of an electric circuit for controlling the supply of electric current to a load, the circuit being in accordance with the present invention, will now be described with reference to the accompanying drawings, in which:

FIGURE 1 shows the circuit in block schematic form,
FIGURE 2 shows a part of the circuit of FIGURE 1 in more detail,
FIGURE 3 shows another part of the circuit of FIGURE 1 in more detail, and
FIGURE 4 shows the same part of the circuit of FIGURE 1 as FIGURE 2, but in a modified form.

The circuit to be described is to be used for controlling the supply of alternating electric current to a load formed by a plurality of parallel-connected neon discharge lamps, each of which has a current limiting resistor individual to that lamp connected in series with it. It should, however, be appreciated that the utility of the invention is not limited to circuits used for this particular purpose.

The circuit will first be briefly described with reference to FIGURE 1 of the accompanying drawings. The source 1 from which the supply for the load is derived is an alternating current generator which supplies an output signal having a frequency of 400 cycles per second. The output of the source 1 is supplied to a control circuit 2 and the load. The output of the source 1 is also supplied, by way of divider circuits 3, to a monostable circuit 4 the output of which is supplied by way of an amplifier 5 to the control circuit 2. The monostable circuit 4 has a period which can be varied under the control of a potentiometer 6. The power supplies necessary for operating the divider circuits 3, the monostable circuit 4 and the amplifier 5 are derived from the output of the source 1 by a power supply arrangement 7.

FIGURE 2 of the accompanying drawings, to which reference is now made, shows the control circuit 2 in more detail, together with the source 1 and the load 8. One terminal of the source 1 is connected by way of the load 8 to one end of a diagonal of a rectifier bridge 9, the other end of this diagonal being connected to the other terminal of the source 1. The two ends of the other diagonal of the rectifier bridge 9 are connected together through a semiconductor controlled rectifier 10 and a choke 11 in series, the cathode terminal of the semiconductor controlled rectifier 10 being adjacent the choke 11. The gate of the semiconductor controlled rectifier 10 is connected by way of a resistor 12 to a terminal 13.

The source 1 is also connected across the primary winding 14 of a transformer 15 having a secondary winding 16. One end of the secondary winding 16 is connected to the anode terminal of the semiconductor controlled rectifier 10, and the other end by way of a resistor 17 to the anode terminal of a rectifier element 18. The cathode terminal of the rectifier element 18 is connected by way of a capacitor 19 to the anode terminal of the semiconductor controlled rectifier 10, and directly to the anode terminal of a semiconductor controlled rectifier 20. The cathode terminals of the semiconductor controlled rectifiers 10 and 20 are both connected to a terminal 21, and the gate of the semiconductor controlled rectifier 20 is connected by way of a resistor 22 to a terminal 23.

Reference is now made again to FIGURE 1 of the accompanying drawings, for a description of a part of the circuit which is not shown in detail as it may be of known form. This part comprises the divider circuits 3 which are formed by two astable transistor circuits which are connected together in cascade. The output of the source 1 is supplied to the first of these two circuits, which together divide the frequency of the output of the source 1 by a factor of eight, so as to provide a derived signal having a frequency of fifty cycles per second.

This derived signal is supplied to the terminal 24 of the monostable circuit 4 which is shown in detail in FIGURE 3, of the accompanying drawings, to which reference is now made. The monostable circuit 4 is a two-condition circuit comprising a pair of junction transistors 25 and 26, and it is arranged to be triggered into its unstable condition by the beginning of each cycle of the fifty cycle per second derived signal.

The monostable circuit 4 includes the potentiometer 6, variation of which enables the duration of the period for which the monostable circuit 4 remains in its unstable condition to be controlled, the range of variation being from a comparatively short interval up to a maximum which is slightly less than one complete period of the fifty cycle per second derived signal.

Referring also to FIGURE 2 of the accompanying drawings, the output of the monostable circuit 4 is supplied, after amplification by the junction transistors 27 and 28 of the amplifier 5, between the terminals 13 and 21. The output supplied by the monostable circuit 4 when in its unstable condition is such as to cause the semiconductor controlled rectifier 10 to fire.

The output of the monostable circuit 4 is also supplied, after differentiation by a capacitor 29 and amplification by the junction transistors 30 and 31 of the amplifier 5, between the terminals 21 and 23. The output supplied by the monostable circuit 4 when it returns to its stable condition is such as to cause the semiconductor controlled rectifier 20 to fire.

The operation of the circuit is then as follows; it first being assumed that the monostable circuit 4 is controlled so as to return to its stable condition comparatively slowly. This being so, an alternating current signal is supplied to the load 8 substantially continuously, as alternate half cycles of the alternating current signal supplied by the source 1 are able to reach the load 8 by way of the semiconductor controlled rectifier 10, the choke 11, and one or other of the arms of the rectifier bridge 9. Each of the neon lamps forming the load 8 will therefore be at its maximum brightness, as during each half cycle the neon lamps will begin to discharge when the applied voltage exceeds the minimum necessary to cause discharge, and will continue to discharge until the applied voltage falls below the level at which the discharge ceases.

If now it is assumed that the monostable circuit 4 is controlled so as to remain in its unstable condition for a rather shorter period following the beginning of each cycle of the fifty cycle per second derived signal supplied thereto, then the brightness of the neon lamps will be somewhat lower.

This is because the capacitor 19 is charged, through the rectifier element 18 and resistor 17, during those half cycles of the signal appearing across the secondary winding 16 of the transformer 15 which cause the rectifier element 18 to conduct. This means that when the monostable circuit 4 returns to its stable condition and the semiconductor controlled rectifier 20 is caused to fire by the pulse supplied to its gate from the terminals 21 and 23, the charge on the capacitor 19 flows through the semiconductor controlled rectifier 20 in the forward direction. A current therefore tends to flow through the semiconductor controlled rectifier 10 in the reverse direction, so that the semiconductor controlled rectifier 10 rapidly assumes its high impedance in the forward direction, and the alternating current signal is not then supplied to the neon lamps. The choke 11 is provided to prevent the current pulse resulting from the discharge of the capacitor 19 passing through the rectifier bridge 9 and the neon lamps.

The brightness of the neon lamps will, therefore, be lower than in the case previously considered, and it will be appreciated that the neon lamps can, in fact be dimmed to the point of extinction by controlling the monostable circuit 4 in such a way that the interval during each cycle of the fifty cycle per second derived signal during which the semiconductor controlled rectifier 10 has its low impedance in the forward direction is reduced, in the limit, to zero.

In cases where the monostable circuit 4 remains in its unstable condition for only a short period the signal supplied to the gate of the semiconductor controlled rectifier 10 is, in effect, a short duration pulse, and it is found that this pulse may be of rather poor shape, and may not therefore, give reliable operation.

Referring in particular to FIGURE 3 of the accompanying drawings; to avoid difficulties arising in this way, the output lead from the monostable circuit 4 over which the control signal for the semiconductor controlled rectifier 10 is supplied to the amplifier 5 is connected to earth by way of the emitter-collector path of a junction transistor 32, which also has a base electrode. The fifty cycle per second derived signal is supplied to the base electrode of the transistor 32 from the terminal 24, so that for a short interval at the beginning of each cycle of the derived signal the transistor 32 is conducting and no control signal is, therefore, supplied to the semiconductor controlled rectifier 10. The periods for which the transistor 32 remains conducting are, however, very short, and merely have the effect of improving the shape of the leading edge of the control signal supplied to the semiconductor controller rectifier 10. A rectifier element 33 is provided to prevent an unduly large voltage from developing between the base and emitter electrodes of the transistor 32.

Referring again to FIGURE 1 of the accompanying drawings, the power supply arrangement 7 which supplies the direct current potentials necessary to operate the divider circuits 3, the monostable circuit 4 and the amplifier 5 comprises a transformer, to the primary winding of which the source 1 supplies a signal, a rectifier arrangement, and a Zener diode which has a reverse breakdown voltage of such a value as to give the required potential.

It is of course necessary to select the frequency of operation in such a way as not to introduce an objectionable flicker in the neon lamps. The frequency of the derived signal supplied to the monostable circuit 4, in the example described fifty cycles per second, should not however be more than twice the frequency of the signal supplied to the source 1 to the rectifier bridge 9.

In the circuit described above the load 8 is supplied with alternating current. The control circuit 2 may, however, readily be modified in such a way that a unipolar current is supplied to the load 8. One way in which this modification can be made is shown in FIGURE 4 of the accompanying drawings to which reference is now made.

FIGURE 4 shows the modified control circuit 2 in detail, together with the source 1 and the load 8. In this case, the source 1 is connected across one diagonal of a rectifier bridge 34, whilst connected across the other diagonal of the rectifier bridge 34 are two parallel-connected paths. The first of these paths comprises a semiconductor controlled rectifier 35 and the load 8 connected in series in that order, and the second of these paths comprises a semiconductor controlled rectifier 36, a rectifier element 37 and a resistor 38 connected in series in that order. The cathode terminals of the semiconductor controlled rectifiers 35 and 36 are both adjacent the rectifier bridge 34 and are both connected to the terminal 21, whilst their anode terminals are connected together by way of a capacitor 39.

The gates of the semiconductor controlled rectifiers 35 and 36 are connected by way of resistors 40 and 41 respectively to the terminals 13 and 23 respectively. Terminals 13, 21 and 23 appear also in FIGURE 3 of the accompanying drawings.

Referring also to FIGURE 3 of the accompanying drawings, the operation of the modified control circuit 2 is as follows; it first being assumed that the monostable circuit 4 is controlled so as to return to its stable condition comparatively slowly. This being so, the bridge network 34, which acts as a full-wave rectifier, supplies a unipolar signal, comprising all the half cycles of the alternating current supplied by the source 1, to the load 8 substantially continuously, as the semiconductor controlled rectifier 35 has a low impedance in the forward direction substantially continuously. Each of the neon lamps forming the load 8 will therefore be at its maximum brightness, as during each half cycle, the neon lamp will begin to discharge when the applied voltage exceeds the minimum necessary to cause discharge, and will continue to discharge until the voltage falls below the level at which the discharge ceases.

If now it is assumed that the monostable circuit 4 is controlled so as to remain in its unstable condition for a rather shorter period following the beginning of each cycle of the fifty cycle per second derived signal supplied thereto, then the brightness of the neon lamps will be somewhat lower. This is because when the semiconductor controlled rectifier 35 has its low impedance in the forward direction the capacitor 39 charges through the rectifier element 37 and the resistor 38.

This means that when the monostable circuit 4 returns to its stable condition and the semiconductor controlled rectifier 36 is caused to fire, the charge on the capacitor 39 flows through the semiconductor controlled rectifier 36 in the forward direction and tends to flow through the semiconductor controlled rectifier 35 in the reverse direction, so that the semiconductor controlled rectifier 35 rapidly assumes its high impedance in the forward direction and the output of the rectifier bridge 34 is not then supplied to the neon lamps.

The brightness of the neon lamps will therefore, be lower than in the case previously considered, and it will be appreciated that the lamps can in fact be dimmed to the point of extinction by controlling the monostable circuit 4 in such a way that the interval during each cycle of the fifty cycle per second derived signal during which the semiconductor controlled rectifier 35 has its low impedance in the forward direction is reduced, in the limit, to zero.

It is not essential, in either of the described versions of the control circuit 2, for the semiconductor controlled rectifier 10 (or 35) to have its low impedance in the forward direction when the monostable circuit 4 is in its unstable condition, as the circuit can be modified to operate with the semiconductor controlled rectifier 10 (or 35) having its low impedance in the forward direction when the monostable circuit is in its stable condition.

The semiconductor controlled rectifiers 10 and 11, or 35 and 36, may be silicon controlled rectifiers.

If the current supplied to more than one load is to be separately controlled it is not necessary to duplicate the entire circuit.

In cases where the control circuit 2 is as shown in FIGURE 2 of the accompanying drawings, the divider circuits 3, the rectifier bridge 9, and the power supply arrangement 7, may be common to more than one load. A monostable circuit 4, semiconductor controlled rectifiers 10 and 11, and the associated parts of the control circuit 2 must, however, be provided for each load, to enable the required separate control to be obtained.

In cases where the control circuit 2 is as shown in FIGURE 4 of the accompanying drawings, the divider circuits 3 and the power supply arrangement 7, may be common to more than one load. A monostable circuit 4, and a control circuit 2 must, however, be provided for each load, to enable the required separate control to be obtained.

As previously noted the circuit is not limited in its application to neon lamps and it may be used, for example, for controlling the brightness of fluorescent lamps or electroluminescent panels. Alternatively, the circuit can be adapted for use in controlling the speed of an electric motor.

I claim:

1. An electric circuit for controlling the supply of electric current to a load comprising a rectifier bridge across one diagonal of which is arranged to be supplied an alternating current signal from a source, the load being arranged to be connected in the path between one end of said diagonal and the source, gate means connected with said rectifier bridge so that when said gate means has a given condition an alternating current voltage is supplied from the source to the load, and means to derive from the source a signal having a frequency not greater than twice the frequency of the signal supplied to the rectifier bridge, each cycle of this derived signal being arranged to trigger a two-condition monostable circuit into its unstable condition and the gate means being controlled so that it has said given condition while the monostable circuit is in one only of its conditions, the monostable circuit having provision to vary the duration of intervals during which it remains in its unstable condition subsequent to being triggered into this unstable condition, the arrangement being such that variation of the duration of the intervals during which the monostable circuit remains in its unstable condition results in control of the supply of electric current to the load.

2. An electric circuit for controlling the supply of electric current to a load comprising rectifier means to which is arranged to be supplied an alternating current signal from a source, gate means connected with said rectifier means so that when said gate means has a given condition the rectifier means supplies a unipolar voltage to an output of the circuit to which the load is arranged to be connected and means to derive from the source a signal having a frequency not greater than twice the frequency of the signal supplied to said rectifier means, each cycle of this derived signal being arranged to trigger a two-condition monostable circuit into its unstable condition and the gate means being controlled so that it has said given condition while the monostable circuit is in one only of its conditions, the monostable circuit having provision to vary the duration of intervals during which it remains in its unstable condition, the arrangement being such that variation of the duration of the intervals during which the monostable circuit remains in its unstable condition results in control of the supply of electric current to the load.

3. A circuit in accordance with claim 1 wherein the gate means includes a first semiconductor controlled rectifier connected in a path between the rectifier means and the output of the circuit, the first semiconductor controlled rectifier being controlled to have its low impedance in the forward direction when the monostable circuit is in said one of its conditions so that said voltage is then supplied to the output of the circuit by way of the anode-cathode path of the first semiconductor controlled rectifier.

4. A circuit in accordance with claim 3 wherein the gate means also includes capacitance which is arranged to be charged when the first semiconductor controlled rectifier has its low impedance in the forward direction and which, when the monostable circuit assumes its other condition, is arranged to tend to discharge through the first semiconductor controlled rectifier in such a sense that the first semiconductor controlled rectifier assumes its high impedance in the forward direction.

5. A circuit in accordance with claim 4 wherein the gate means also includes a second semiconductor controlled rectifier connected with said capacitance in a path between the anode and the cathode of the first semiconductor controlled rectifier, the second semiconductor controlled rectifier having its high impedance in the forward direction when the monostable circuit is in said one of its conditions and being controlled to have its low impedance in the forward direction when the monostable circuit assumes its other condition so that said capacitance is then able to discharge through the anode-cathode path of the second semiconductor controlled rectifier in the forward direction.

6. A circuit in accordance with caim 2 wherein the gate means includes a first semiconductor controlled rectifier connected in a path between the rectifier means and the output of the circuit, the first semiconductor controlled rectifier being controlled to have its low impedance in the forward direction when the monostable circuit is in said one of its conditions so that said voltage is then supplied to the output of the circuit by way of the anode-cathode path of the first semiconductor controlled rectifier.

7. A circuit in accordance with claim 6 wherein the gate means also includes capacitance which is arranged to be charged when the first semiconductor controlled rectifier has its low impedance in the forward direction and which, when the monostable circuit assumes its other condition, is arranged to tend to discharge through the first semiconductor controlled rectifier in such a sense that the first semiconductor controlled rectifier assumes its high impedance in the forward direction.

8. A circuit in accordance with claim 7 wherein the gate means also includes a second semiconductor controlled rectifier connected with said capacitance in a path between the anode and the cathode of the first semiconductor controlled rectifier, the second semiconductor controlled rectifier having its high impedance in the forward direction when the monostable circuit is in said one of its conditions and being controlled to have its low impedance in the forward direction when the monostable circuit assumes its other condition so that said capacitance is then able to discharge through the anode-cathode path of the second semiconductor controlled rectifier in the forward direction.

9. A circuit in accordance with claim 2 wherein the gate means is controlled so that it has said given condition while the monostable circuit is in its unstable condition.

10. A circuit in accordance with claim 2 wherein the frequency of said derived signal is one eighth of the frequency of the signal supplied to said rectifier means.

11. A circuit in accordance with claim 2 wherein the frequency of said derived signal is arranged to be fifty cycles per second.

12. A circuit arrangement comprising a circuit in accordance with claim 2 and a load, the load being formed by a number of neon discharge lamps.

13. A circuit in accordance with claim 1 wherein the gate means is controlled so that it has said given condition while the monostable circuit is in its unstable condition.

14. A circuit in accordance with claim 1 wherein the frequency of said derived signal is one eighth of the frequency of the signal supplied to said rectifier means.

15. A circuit in accordance with claim 1 wherein the frequency of said derived signal is arranged to be fifty cycles per second.

16. A circuit arrangement comprising a circuit in accordance with claim 1 and a load, the load being formed by a number of neon discharge lamps.

References Cited by the Examiner
UNITED STATES PATENTS

| | | | |
|---|---|---|---|
| 2,785,370 | 3/1957 | Levy | 323—23 X |
| 3,075,136 | 1/1963 | Jones | 307—88.5 |
| 3,113,241 | 12/1963 | Yonushka | 307—88.5 |
| 3,174,107 | 3/1965 | Quackenbush | 328—70 |

LLOYD McCOLLUM, *Primary Examiner.*